United States Patent
Henderson et al.

(10) Patent No.: US 7,506,877 B1
(45) Date of Patent: Mar. 24, 2009

(54) BIT OR TOOL EXTENSION AND METHOD OF MAKING SAME

(76) Inventors: David L. Henderson, 3541 NE. 56th Pl., Delaware Township, Berwick, IA (US) 50032; Robert E. McFarlin, Jr., 2622 E. 30th St., Des Moines, IA (US) 50317

( * ) Notice: Subject to any disclaimer, the term of this patent is extended or adjusted under 35 U.S.C. 154(b) by 426 days.

(21) Appl. No.: 11/331,760

(22) Filed: Jan. 13, 2006

Related U.S. Application Data (60) Provisional application No. 60/643,727, filed on Jan. 13, 2005.

(51) Int. Cl.
*B23B 31/171* (2006.01)
(52) U.S. Cl. .......................... 279/76; 279/143; 407/49; 408/143
(58) Field of Classification Search ............ 408/239 R, 408/240, 239 A, 143; 407/49; 409/182; 279/76, 83, 87, 143, 56, 57, 66, 67, 68, 69, 279/70, 130
See application file for complete search history.

(56) References Cited

U.S. PATENT DOCUMENTS

| | | | |
|---|---|---|---|
| 2,257,169 A | 9/1941 | Hopps | |
| 2,793,041 A | 5/1957 | Barbier et al. | |
| 3,091,474 A | 5/1963 | Boutros et al. | |
| 4,575,287 A * | 3/1986 | Oshnock et al. | ............... 407/41 |
| 4,647,052 A * | 3/1987 | Butikofer | ..................... 279/83 |
| 4,930,947 A * | 6/1990 | Jacobson | ..................... 408/153 |
| 5,096,212 A | 3/1992 | Walsh | |
| 5,288,182 A * | 2/1994 | Patterson et al. | ............ 408/146 |
| 5,348,319 A | 9/1994 | Stolzer | |
| 6,318,936 B1 | 11/2001 | McFarlin, Jr. et al. | |
| 6,332,619 B1 | 12/2001 | DeRosa | |
| 6,520,227 B2 | 2/2003 | Mc Farlin, Jr. et al. | |
| 6,619,878 B2 * | 9/2003 | Wang et al. | ............... 403/374.3 |
| 6,880,832 B2 * | 4/2005 | DeRosa | ....................... 279/44 |
| 7,172,377 B2 * | 2/2007 | McFarlin et al. | ............ 409/234 |
| 2005/0141977 A1 | 6/2005 | McFarlin, Jr. et al. | |

* cited by examiner

*Primary Examiner*—David P Bryant
*Assistant Examiner*—Eric A. Gates
(74) *Attorney, Agent, or Firm*—McKee, Voorhees & Sease, P.L.C.

(57) ABSTRACT

An apparatus, method and system for extending working tool or bit from a source of rotary power, including a body with a shank, blind bore for the shank of the tool or bit, a tangential bore, a clamping member insertable through one end of the clamping bore, the clamping member having an internal threaded bore, a threaded fastener inserted through the other end of the clamping bore into the threaded bore of the clamping member, an opening into the blind bore into which a wedging section of the clamping member can be drawn tangentially by action of the threaded member.

24 Claims, 5 Drawing Sheets

BIT OR TOOL EXTENSION AND METHOD OF MAKING SAME

CROSS-REFERENCE TO RELATED APPLICATIONS

This application claims priority under 35 U.S.C. § 119 of provisional application Ser. No. 60/643,727 filed Jan. 13, 2005, which application is hereby incorporated by reference in its entirety.

BACKGROUND OF THE INVENTION

A. Field of Invention

The present invention relates to an apparatus for extending a bit or tool from its source of rotational power, and in particular, a bit or tool extension using tangential clamping and a single tool for operation of the clamping mechanism. In other forms, the invention can comprise a bit or tool clamp integrated with a machine, instead of any extension.

B. Problems in the Art

Previous extensions used a standard threaded collet design supplied with an extended shank to extend the reach of the bit when needed. They were supplied with internal or external threaded means to compress either the nut or a peripheral set of flexible fingers or a separate collet sleeve actuated by a nut threaded over the outside diameter of the extension body which, when tightened, compressed the fingers of the sleeve onto the bit shank, thereby retaining it. The previous methods require the use of two wrenches or the arbor lock of the router to tighten and release the bit shank in the extension. They also add an extreme amount of length to the shank, requiring a substantial spacer to be fabricated so as to return the useable stroke of the router. Also, due to the extreme length and slim profile, they are prone to introducing a substantial amount of concentric rotating whip into the spinning bit which the user would perceive as vibration both with the bit cutting and free running.

Other partial solutions are described in U.S. Pat. Nos. 3,091,474 and 5,348,319 and 5,096,212 and 6,332,619 B1. These allow single tool cutter changes without the use of the arbor locks or the factory tool wrench system. Disadvantages to these designs are difficulty in manufacturing and the inability to use standard and large shank bits. Also, the need for individual collets for each brand of router becomes apparent when the wide varieties of collet designs used by each manufacturer are taken into account. The collets do nothing to extend the reach of the cutter when it is needed, such as on a legacy mill. Special extra-long bits are needed for these machines which are hard to find and expensive when located. The eccentric sleeve used to clamp the bit is difficult to make and requires extreme care to ensure proper alignment and correct clamping. These sleeves are also oriented so that if the fastener should fail, the rotation of the bit shank will force the sleeve out of contact with the bit shank, therefore releasing the cutter from the machine. Another disadvantage to the eccentric sleeves used previously is they indent the shaft of the bit due to the low angular tangency. This can render the bit unusable. It can also prevent withdrawal of the bit from the collets. Other disadvantages to these designs are the difficulty of keeping the bore of the collets concentric with the centerline of the arbor due to the cone shape formed on the bottom of the collets to mate with the factory taper. Due to the clearance required to insert and remove the cutter when the bit is clamped in operating position, the centerline of the bit is no longer concentric with the center line of the arbor onto which it is mounted. They also have no means of retaining the bit in the collets when used in collets-down, vertical position. Assembly and repair is also hindered by the design of these chucks. The retention pins and spring rings used to hold the various components together are subject to catastrophic failure. If either the spring rings or retention pins fail, the collets are free to disengage from the machine arbor. Since the body of these tangential clamping designs is threaded, breaking the bolt off (broken piece remains in body) renders the collets useless and the end user would have to purchase another.

BRIEF SUMMARY OF THE INVENTION

A. Advantages

Advantages of the present design are:

Ease of assembly due to a radiusing of the clamping sleeve to match the outside diameter of the body.

The sleeve/wedge is eccentric in nature and easy and economical to manufacture.

Due to the high wrap-around tangency, it is almost impossible to mar/indent the shank of the cutter.

Even under excessive clamping pressure, the mark left on the shank is minimal and the cutter can still be withdrawn from the collets.

With the sleeve being threaded, rather than the body of the collets, it is easily repairable even if the bolt breaks off.

Either the broken fastener on the bolt can be removed from the wedge (it still protrudes from the wedge) and/or a new wedge and bolt can be purchased. The bolt is a hardware store item and is readily available.

The design is far more universal and allows a single size to be used across a wide variety of brands of routers.

Manufacturing techniques are used to ensure the centerline of the bit is concentric to the centerline of the arbor when it is clamped into the extension and the extension is in turn clamped into the machine arbor/collets.

The very design and mass, along with the short overall length, helps alleviate the whipping problem observed in the extension sold by many others.

A fatigue-proof steel can be used in the manufacture of our extension although other tough steels known to the industry could be used.

The bore in which the sleeve slides is also sized to provide a full bearing surface to prevent deflection of the sleeve which maximizes sleeve-to-bit shank contact. The sleeve is close to the full depth of the bore in which it slides. This also ensures maximum bit contact while aiding in the accurate milling of the radius in the edge of the sleeve for, again, maximum shank contact.

The sleeve is also oriented to work with the rotation of the bit to affect a self-clamping or enhancement of the clamping force provided by the threaded fastener.

Even if the fastener should fail, the rotation effect of the shank on the sleeve will work to draw the sleeve into the extension body and not outward away from the bit shank therefore acting as a self restraining mechanism for bit retention.

Resilient rings/ring provides a method of biasing the sleeve to a released position when the clamping force is released. They/it also act to retain the bit in the extension when used in a bit-down, vertical position such as the legacy mill or pin routing machine. They also act as an alignment aid when inserting a reducing sleeve/bushing.

Since no parts but the factory collets components are used to retain the extension to the arbor, the chances of failure or release from the machine arbor are greatly reduced.

Balancing is greatly enhanced due to the fact that the clamped position of the bit is concentric with the extension shank centerline and therefore the machine arbor centerline. This eliminates what we call the variable mass from the balancing equation making balancing easier and far more accurate. This variable mass is created by the use of various diameters and lengths of bits and also the weight of these bits.

B. Other Objects, Features, Aspects, or Advantages of the Invention

One aspect of the present invention comprises a bit extension designed to extend the reach of the router bit above/below the base of the router/machine base plate to give added reach and also allow easy bit changing with a single tool without using the factory arbor/arbor lock or two wrenches when used in conjunction with a table/handheld/machine mounted router. It has a bore sized to receive cutter bits known as router bits and a shank sized to fit in the collets of the router. It also includes a tangential clamping mechanism operated by a single tool, enabling it to be used by handicapped persons and is universal across all brands of routers which have the proper size collets as it does not depend on any threaded means other than the factory supplied collet to mount it to the router.

Also included in the invention is a method of machining which accurately locates the blind bore centerline and the centerline of the tool's arbor/collets which eliminates or reduces the off-center rotation of the cutter/bit which reduces vibration and makes balancing the assembly consistent regardless of the mass inserted into the blind bore (i.e. size, length and diameter of cutter bit).

C. General Summary of Invention

The present invention relates to an apparatus, method of using the same, and a method of manufacturing the same. It can be useful in a wide variety of applications. One is to extend the working end of a bit from its rotational source of power. Another is to clamp a bit or shank of a tool.

An apparatus according to one aspect of the invention comprises a body including a shank with a centerline. The shank is adapted to fit and be secured in the source of rotational power. The body also includes a portion having a top through which a blind bore is formed. The blind bore has a centerline generally in alignment with the centerline of the shank, but not necessarily coaxial. A clamping bore generally tangential to the blind bore extends through a portion of the body. The clamping bore intersects with the blind bore such that there is an opening between the clamping bore and the blind bore. A clamping sleeve slideably sits within one portion of the clamping bore. The clamping sleeve has a through-bore that is internally threaded. The inner end of the clamping bore has a radiused clamping surface that is adapted to extend into the opening between the blind bore and the clamping bore. A fastener or bolt having a threaded shaft extends from an opposite side into the clamping bore. The threaded shaft mateably threads into the internal threaded through-bore of the clamping sleeve. Tightening of the bolt brings the sleeve into, and holds the sleeve opening to the blind bore. Therefore, a single sleeve, elongated along its axis, presents a substantial bearing surface along a substantial portion of clamping bore. Clamping is achieved by pulling the sleeve into the body. One tool can be used to accomplish the clamping. Likewise, one tool can be used to de-clamp the bit from the blind bore.

In one embodiment of this aspect of the invention, the clamping bore has a first section adapted for the close, mateable fitting of the clamping sleeve. The clamping sleeve exterior is eccentric to the centerline of the threaded through-bore of the clamping sleeve. A second, smaller-in-diameter section of the clamping bore defines a shoulder between the sleeve portion and the smaller-in-diameter middle portion of the clamping bore. An O-ring or other resilient member can be placed between the inner end of the clamping sleeve and the shoulder. When the sleeve is brought into clamping position, the resilient member resists that force and provides biasing force back in the opposite direction. This is advantageous in a number of ways. For example, it allows a bit to be retained in the blind bore even if the clamping sleeve is loosened somewhat. This can be advantageous if the bit is facing downward (the bit will not drop out of the bit extension). It also serves to hold the bolt in place if the sleeve is disengaged from the bolt. It has other advantages. A third portion of the clamping bore includes a section for the head of the bolt to enter the bit extension body. Its diameter can be larger than the middle portion of the clamping bore. A shoulder on that opposite side of the middle portion of the clamping bore can therefore define a mechanical stop for the bolt. Optionally, a washer or other anti-wear member can be positioned between the bolt head and that shoulder.

These aspects of the invention therefore allow for universal clamping of bits or tools having shanks that are insertable into the blind bore. A reducing sleeve, such as are known in the art, can be inserted into the blind bore to allow smaller diameter shanks to be used in the same bit extension. This single tool, on/off arrangement is highly beneficial for quick and easy bit changing. A common threaded fastener or bolt is easily replaceable if the threads are damaged or if it breaks off. Additionally, if the bolt breaks off, the head of the bolt can be removed as can the sleeve and easily replaced. The substantial exterior of the clamping sleeve, in close mating with its section of the clamping bore, provides a substantial bearing surface to provide good clamping of the bit shank in the blind bore. It also deters the clamping sleeve from biting or marking the bit shank and damaging it.

In another aspect of the invention, a balancing method can be integrated into the bit extension body. Because the clamping bore removes a portion of the mass on one side of the bit extension body relative to the blind bore, to compensate for that loss of mass, some of the mass can removed from generally the other side of the body. This could be in the form of a bore or a removal of material from that other side.

In another aspect of the invention, the method of making the bit extension helps provide a more balanced device. The first form of the body of the bit extension can be oversized. Clamping by pressing on one side of the bit shank in the blind bore can result in the bit centerline moving slightly off the blind bore centerline. This can create whipping action when the bit is rotated. By empirical testing and some estimation, the amount of off-set of bit centerline from blind bore centerline, when securely clamped, can be derived. When finally machining or forming the body of the bit extension, some mass can be taken off the side of the body opposite to the direction the bit is moved off of the blind bore centerline. Or this could include literally machining the shank of the bit extension to move the centerline of the same about the same distance off of the blind bore centerline as the bit centerline shifts when clamped. Doing so would then make coaxial or concentric the centerlines of the bit when clamped in the bit extension and the bit extension shank to eliminate this whipping action.

These and other aspects, features, options and advantages of the invention will become more apparent with the accompanying specification.

DETAILED DESCRIPTION OF EXEMPLARY EMBODIMENT

A. Overview

For a better understanding of the invention, one specific embodiment will now be described in detail. Frequent reference will be made to the appended drawings. References numerals or letters will be used to indicate certain parts or locations in the drawings. The same reference numerals or letters will be used to indicate the same parts and locations throughout the drawings unless otherwise indicated.

B. Context of Exemplary Embodiment

The exemplary use is in the field of woodworking routers or shaping machines. A primary application will be with table or machine mounted routers of either the fixed-base or plunge router type and also woodworking shaper machines. This embodiment can be for hand held use but there is usually no need for extending bits in that configuration and use.

1. Preliminary Installation Steps

The extension is mounted onto the factory-supplied arbor or into the factory-supplied collets of the router and the existing retention method for the arbor or collets tightened. The extension is then checked for run-out of which a maximum is supplied with the instructions for use. If the run-out is found to be excessive, the collets are then loosened and the extension/collets sleeve is repositioned and the nut re-tightened. Run-out is again checked and the process is repeated until the mm-out is brought to the absolute minimum. The router bit of choice is now selected and inserted into the bit extension 10, according to the exemplary embodiment (see FIG. 1A).

2. General Description of Exemplary Embodiment

A supplied Allen wrench is used to rotate the clamping screw 50 which, in turn, draws the wedge 48 on clamping sleeve 40 inward and applies the clamping force to the clamping sleeve 40 which bears on the shank of the bit (not shown—but insertable into blind bore 28), effectively clamping the bit into working position in the extension 10. To remove the bit, the clamping screw 50 is rotated counter clockwise which releases the clamping force on the sleeve 40. The resilient member(s) 60 can then bias the sleeve 40 to the unclamped position and the bit can be withdrawn.

It will be appreciated that the invention can be implemented in a number of different forms and applications and is not limited by this specific embodiment.

C. Apparatus

Figure 1A:
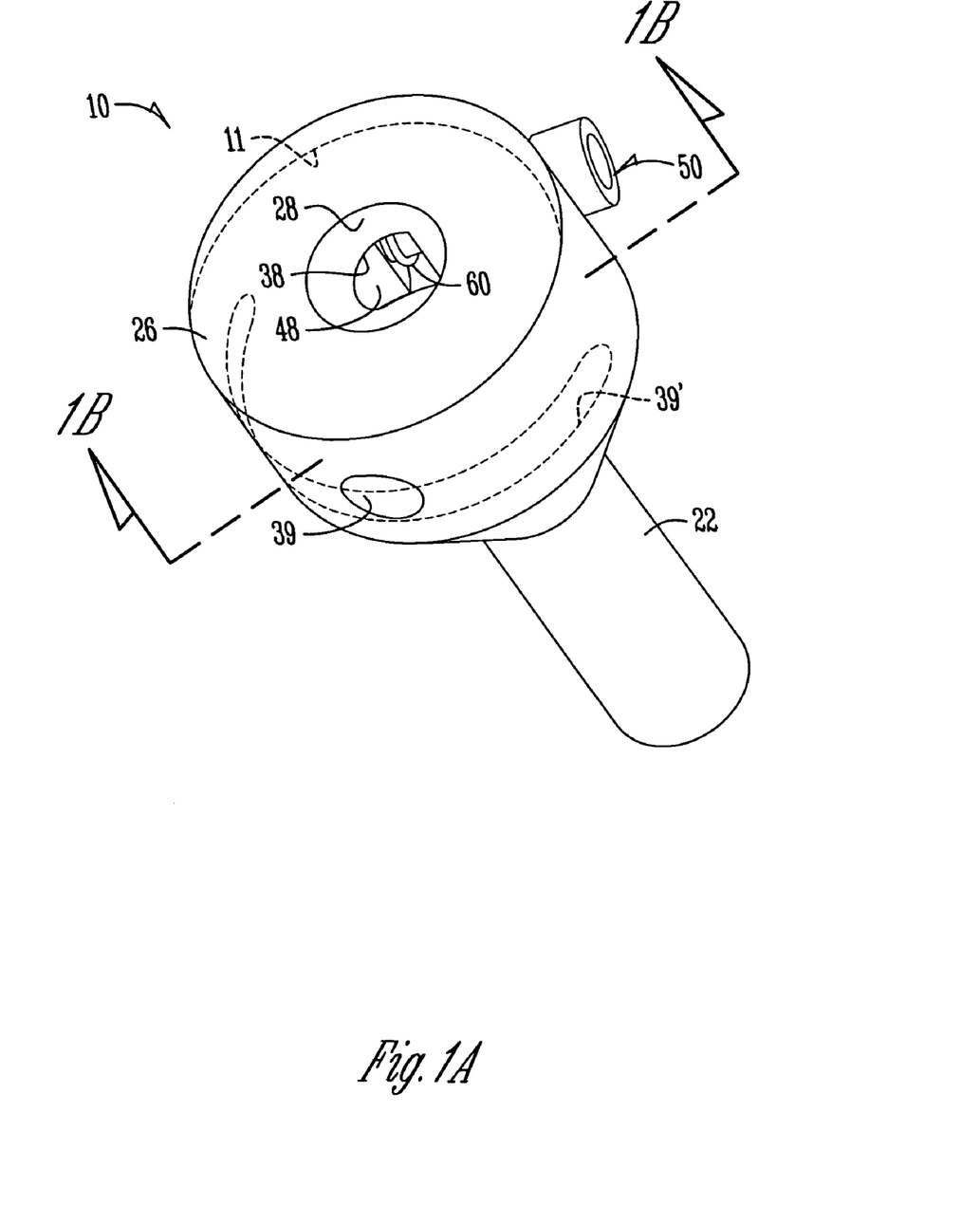
FIGS. 1A-C are various assembled views of an exemplary embodiment according to one aspect of the invention.
Figure 1B:
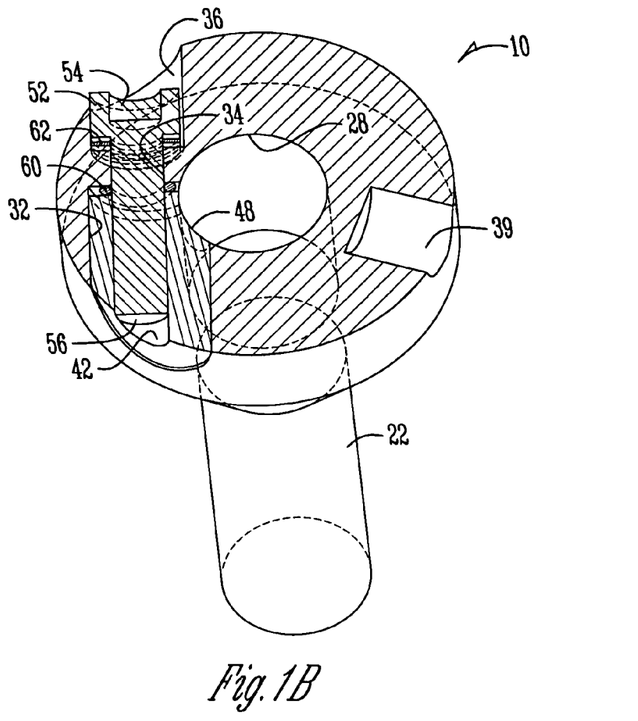
Figure 1C:
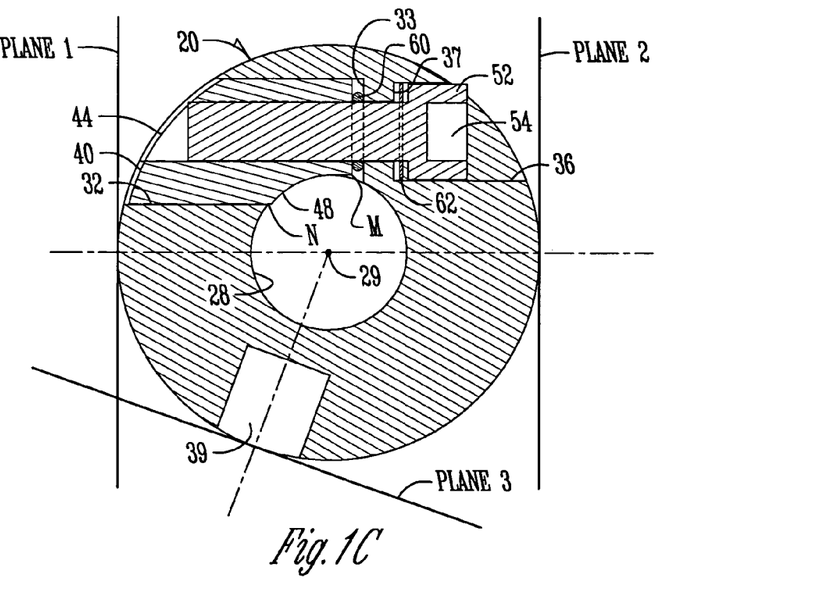

FIGS. 1A-C illustrate various views of a bit extension 10 according to one exemplary embodiment of the present invention. Bit extension 10 is made up of the following components.

Figure 2A:
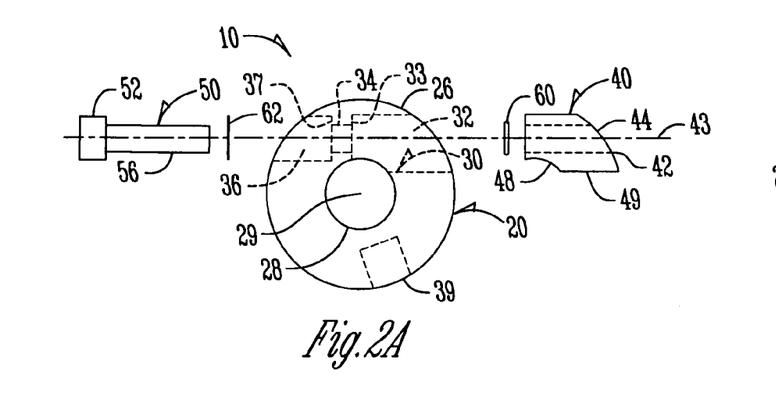
FIGS. 2A-2C are isometric exploded plan views of the embodiment of FIGS. 1A-C.
Figure 2B:
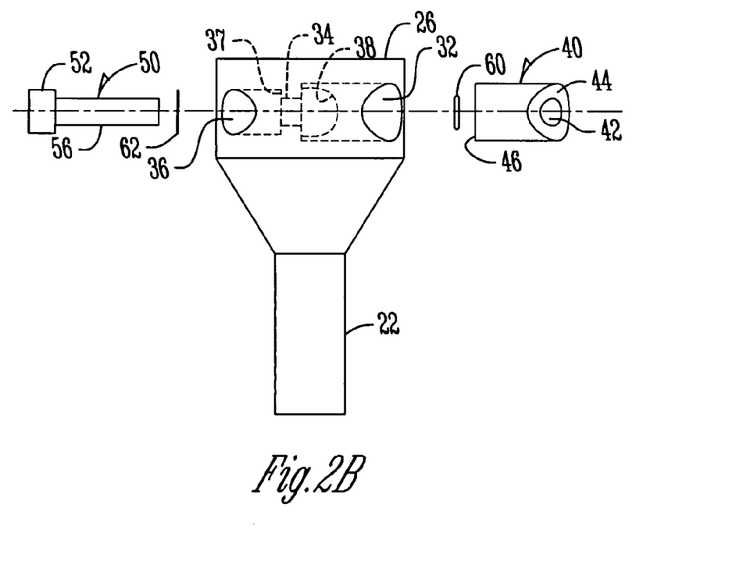
Figure 2C:
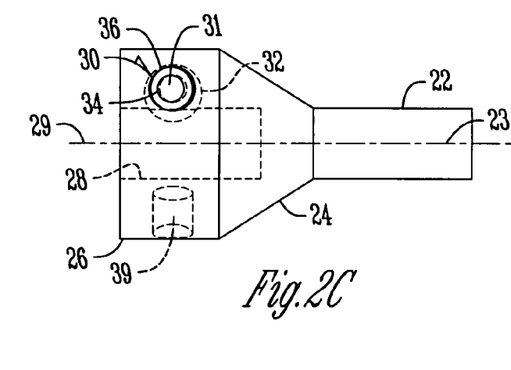

A body 20, of fatigue-proof steel (e.g. E.D. 30 or 50, electric-drawn high tensile steel), has a shank portion 22 with a centerline 23, an intermediate portion 24 (conical in shape), and a top cylindrical portion 26 (see FIG. 2C). It is generally several inches tall and an inch or so at widest diameter. The size can vary according to need.

Shank 22 is configured to be cylindrical in shape and of a diameter to fit within a standard arbor or collets for connection to a rotary power source.

A blind bore 28 is formed from the top end of body 20 inwardly. Blind bore 28 has a centerline 29 (FIG. 2C) which is generally (but not always) identically aligned with centerline 23 of shank 22.

Shank 22 is inserted into the bit receiving connection to the rotary power source. A bit or tool (not shown) having a shank can have the shank inserted in blind bore 28. Bit extension 10 therefore extends the tool farther from the rotational power source than if the bit alone was in place. The advantages of such a bit extension have been referenced previously.

The shank of the bit or tool is removeably or releasably held in blind bore 28 by a clamping mechanism. The clamping mechanism is illustrated in more detail at FIGS. 1B-C.

A clamping bore (designated generally by reference numeral 30) is formed generally tangentially through opposite sides of body 20. In this embodiment, clamping bore 30 has a first section or sleeve section 32 starting at an opening in a side of the top portion 26 of body 20, extending tangentially towards the periphery of blind bore 28, and terminating in a shoulder 33. A second section or mid-section 34 of clamping bore 30 is smaller in diameter than sleeve section 32. A third or bolt-head section 36 of clamping bore 30 is on the opposite side from sleeve section 32 and has a larger diameter than mid-section 34. The junction between bolt-head section 36 and mid-section 34 of clamping bore 30 also has a shoulder (see reference numeral 37).

Each of sections 32, 34, and 36 of clamping bore 30 are non-threaded. The diameter of mid-section 34 is just slightly greater than the diameter of the threaded shaft 56 of a bolt 50 that can be inserted into it through the bolt-head section 36 of clamping bore 30. Head 52 of bolt 50 has a hex socket 54 and has a cross-sectional diameter greater than shaft 56. Washer 62 can be placed around shaft 56 between head 52 and shoulder 37 (e.g., 0.002 inch thick wear washer—hard steel).

Clamping sleeve 40 has a threaded through-bore 42 that threadably mates with the external threads of bolt 50. Through-bore 42 has a centerline 43. Clamping sleeve 40 has a curved outer end 44 and a substantially inner end 46, with a radiused surface 48 on a side of the inner end 46.

The periphery of clamping sleeve 40 is formed to closely follow the shape of sleeve section 32 of clamping bore 30 such that clamping sleeve 40 slideably inserts into sleeve section 32. A resilient O-ring 60 (e.g. rubber) is insertable between inner end 46 of clamping sleeve 40 and shoulder 33 in clamping bore 30.

By referring also to the exploded and isolated views of FIGS. 4A-F, 2A-C and 3 it can be seen that clamping sleeve 40 is eccentrically shaped around the centerline 43 of through-bore 42. Clamping sleeve 40 is elongated along through-bore 42. When installed, clamping sleeve 40 extends over halfway through body 20, and presents a relatively large bearing surface around the exterior the longitudinal aspect of clamping sleeve 40 relative to sleeve section 32 of clamping bore 30.

Bolt 50 (e.g. conventional hardware bolt) is slid through bolt-head section 36 and mid-section 34 of clamping bore 30 and into threadable engagement with through-bore 42 of clamping sleeve 40. By putting a single tool in the hex socket 54 of bolt 50, bolt 50 can be turned further inward as bolt head 52 is prevented from further inward movement into body 20 by shoulder 37. Further rotation of bolt 50 would pull clamping sleeve 40 inwardly until is comes into abutment with O-ring 60. At that point, radiused surface 48 of clamping sleeve 40 would move towards an opening 38 into blind bore 28. This is basically the interface or intersection between clamping bore 30 (in particular the inner end of sleeve section 32 of clamping bore 30) and the orthogonal blind bore 28.

As can be seen from the figures, the radius of curvature of radiused surface 48 is intentionally close to the radius of curvature of blind bore 28. It preferably is close but not identical. Preferably, the radius of the curvature of the clamping surface 48 is greater than the radius of the blind bore 28. This deters marring or notching the bit shank. More preferably, it is slightly greater. The example is 0.2505 inch for the surface 48 and 0.250 inch for the blind bore.

By this manner the clamping action of the shank of a bit in blind bore 28 can be accomplished. One tool can be used with one hand to turn bolt 50 to pull clamping sleeve 40 into contact with the side of the bit shank inserted in blind bore 28. Further turning of bolt 50 can exert clamping force to hold bit in place in bit extension 10. A simple one tool reversal of bolt 50 loosens clamping sleeve 40, enabling removal of the bit or tool from blind bore 28.

The appended drawings show a number of different views of the exemplary embodiment 10 and its structure. These drawings are generally to scale.

The following should be noted:
a. The relatively long length and robust nature of clamping sleeve 40 and its sleeve section 32 of clamping bore 30 provides a relative long and large bearing surface for this clamping element. This holds the clamping element more securely and places more even pressure between radiused surface 48 of clamping sleeve 40 and the bit shank in blind bore 28.
b. O-ring 60 provides some back biasing against the inward movement of clamping sleeve 40. Additionally, when clamping sleeve 40 is slightly loosened, O-ring 60 helps retain the bit (the diameter of the aperture of O-ring 60 is smaller than the diameter of bolt shaft 56). If bit extension 10 is in an inverted position in a machine, as can be seen in FIG. 1A, O-ring 60 can extend into opening 38 to blind bore 28 and expand to frictionally hold bit in bit extension 10 even though gravity tries to push it out. Additionally, O-ring 60 helps align any reducing sleeve or bushing (not shown) inserted into blind bore 28. O-ring 60 can also serve as an indexing mechanism.
c. Bolt 50 can be a common threaded fastener. Therefore, if its threads get stripped, it hex socket gets stripped, it breaks or deforms, it can be inexpensively and easily replaced. Washer 62 can form an anti-wear surface for head 52 of bolt 50.
d. Internal threading of through-bore 42 of clamping sleeve 40 also has the following advantage. If its threads become stripped or if shaft 56 of bolt 50 breaks off inside it, it can be pushed out and replaced. The remainder of bit extension 10 is not affected and thus, breakage of bolt or jamming of clamping sleeve 40 can be reversed without damage to bit extension body 20. Also, after wedge 40 is loosened, body 20 is simply tipped to the opposite side and the wedge 40 moves outward. In many existing designs, the wedge remains stuck.
e. Clamping sleeve 40 (alternatively referred to as wedge 40) is eccentric to through-bore 42. The eccentricity can serve several purposes. It can be an anti-rotation function. It helps align the sleeve 40 into clamping bore 30 in the correct orientation. By anti-rotation it is meant that the bolt 50 and corresponding threaded through-bore 42 are located off center of the wedge or clamping sleeve 40 centerline. Some rotational movement may be present but it is severely limited if tolerances are within reasonable machining tolerances. Sleeve 40 will rotate only because of clearances required for the components to mate easily and allow movement of the parts. The tighter the clearances, the less the movement. Bolt 50 actually is the pivot point around which wedge or sleeve 40 tries to rotate. The eccentric nature of clamping sleeve 40, due to threaded bore 42 being offset in clamping sleeve 40, prevents it from actually rotating beyond a few degrees. It keeps radiused surface 48 in general parallel alignment with blind bore 28 and the shank of the bit. It helps align the outer or first end 44 of clamping sleeve 40. The inner end 46 of clamping sleeve 40 is machined to substantially or approximately match the blind bore 28. In the preferred embodiment, the radius is basically parallel to the blind bore radius.
f. In this embodiment, the radiused surface or camping surface 48 begins at point M of FIG. 1C. This is called the 0° position. Clamping surface 48 would then curve to the left in FIG. 1C greater than 45° from the 0° position, but less than approximately 64° (to point N in FIG. 1C). It provides a substantially long clamping surface.
g. The length of clamping sleeve 40 fills up a substantial amount of the space of clamping bore 30. Bolt 50 fills up a substantial part of the remaining space. This helps replace the lost mass from that side of body 20 to deter imbalance of bit extension 10.
h. To compensate for lost mass because of the clamping mechanism, mass can be removed from generally the opposite side of body 20. In this embodiment, a balancing bore 39 can be formed generally opposite the clamping mechanism in body 20. By empirical methods, the volume of balancing bore 39 can be calculated to essentially balance that side of body 20 because of the loss of mass caused by the clamping mechanism. As shown in FIGS. 1A and B, even when clamping sleeve 40 and bolt 50 are assembled into body 20, there is empty space (e.g. bolt socket 54, part of bore section 36, etc.).
i. This combination deters indenting or scoring the bit shank because of the long bearing surface of clamping sleeve 40 and clamping bore 30 and clamping surface 48. Additionally, this is facilitated by pulling clamping sleeve 40 towards blind bore 28.
j. This additionally tends to have a high wrap-around tendency, meaning that even if bolt 50 breaks, rotation of bit extension 10 would tend to move clamping sleeve 40 towards clamping action as opposed to away from it.
k. The configuration tends to maximize sleeve to bit contact.
l. It tends to be self-clamping. The sleeve works with rotation of the bit and pulls the sleeve to the bit This is like a door wedge to prop open a door. The more the door is pushed up the wedge, the tighter the wedge becomes. This is an advantage when the bit tries to turn in the blind bore.
m. Also, the relative large threaded area helps for a smooth consistent pull of the clamping sleeve 40.

As can be appreciated, the invention can take different forms and embodiments. For example, its size would depend to some extent on the size of the bit it holds. Blind bore 28 would be large enough to slidably receive a bit shank essentially the same diameter. The device can be scaled up and down. But additionally, the specific proportion of the clamping elements to the bit extension can vary. For example, opening 38 into blind bore 28 could extend almost 90° around the circumference of blind bore 28. This generally would require clamping surface 48 to be bigger. It is believed that making opening 38 bigger may not necessarily provide any better clamping or gripping by the wedge, however.

It is important to keep the device balanced. Therefore, preferably tolerances are kept close. For example, it can be preferable that tolerances be kept on the order of +0.0001 to 0.0002.

Figure 3:
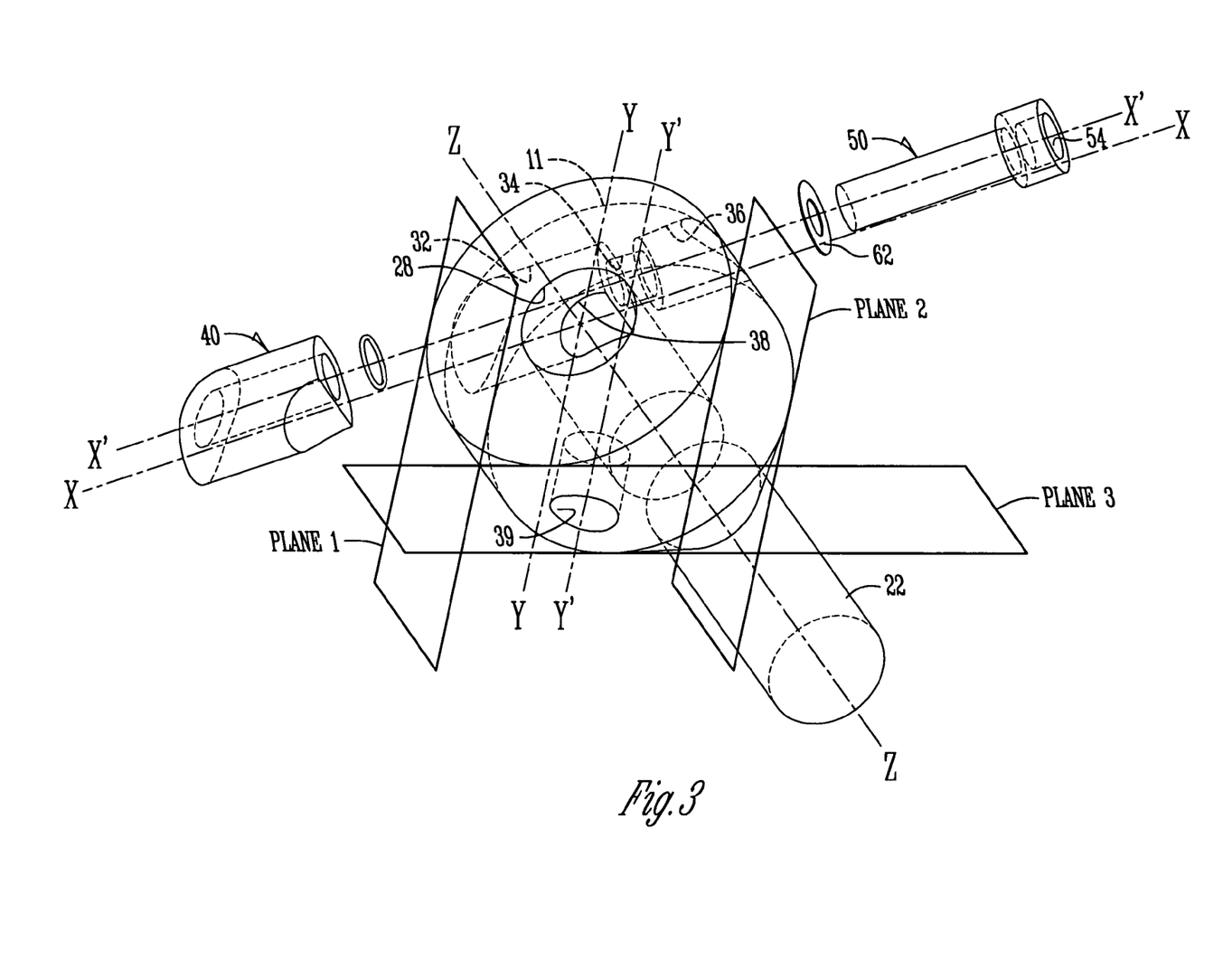
FIG. 3 is an exploded view of the embodiment of FIG. 1 from one side of the device.
Figure 4A:
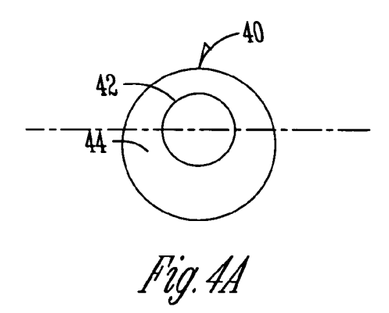
FIGS. 4A-F are various views of a clamping sleeve in isolation such as is used with the device of FIG. 1.
Figure 4B:
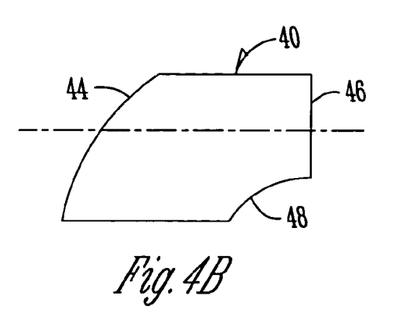
Figure 4C:
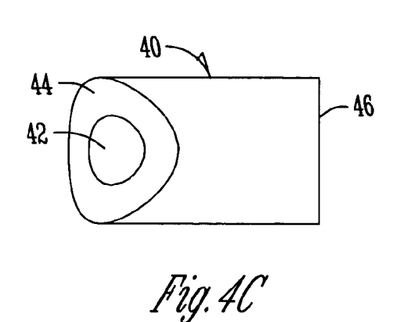
Figure 4D:
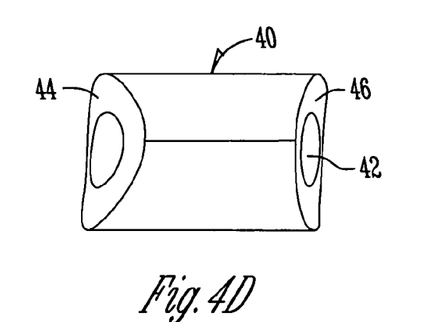
Figure 4E:
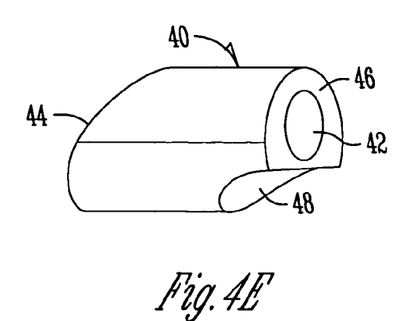
Figure 4F:
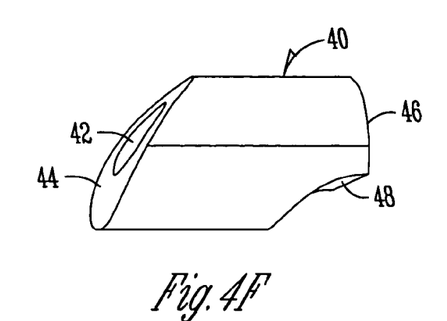

The embodiment of FIG. 1A does show a mechanism for balancing device 10. Balancing bore 39 removes mass from essentially the side of bit extension 10 opposite the clamping sleeve. This is because clamping bore 30, to receive the clamping sleeve 40 and bolt 50, removes mass from that side. Furthermore, as illustrated in FIGS. 1C and 3, it has been found that balancing bore 39 balances best if it is offset in one direction, instead of directly across from clamping bore and sleeve. This is because, as shown in FIG. 1C, when the clamping combination is assembled, the clamping sleeve 40 and bolt shaft 56 occupy much of the removed mass from that side of the body. However, the socket 54 for bolt 52, part of bore 36, and other voids still remain. By trial and error, essentially offsetting balancing bore 39 is shown in FIG. 1C compensates for those voids to get a better balance for device 10. As shown in FIG. 1C, in this embodiment, the center line of balancing bore 39 is approximately 15°-25° towards "PLANE 1", instead of parallel to it, to compensate for the greater amount of missing mass on the "PLANE 2" side of clamping bore 30.

It is furthermore to be understood that it has been found best that the balancing method (such as balancing bore 39) be in what will be called the plane of the clamping sleeve. By referring to FIG. 3, axis Z is the center line of the bit bore 28. Axis X is orthogonal to axis Z as is axis Y. The longitudinal axis of bore 30 for the clamping sleeve has been marked X'. The center line for balancing bore 39 has been indicated by line Y'. The plane of clamping sleeve is defined by X' and Y. Balancing bore 39 should have its center line in that plane. Furthermore, it has been found preferable that the height of balancing bore 39 in the direction of axis Z should not exceed substantially the height of bore 32 for clamping sleeve 40 along axis Z. This is because no mass removal compensation is needed for parts of the body that are above or below clamping sleeve bore 32.

FIG. 1A illustrates diagrammatically that instead of simply a bore 39, a groove 39', elongated and centered along the plane of the clamping sleeve on the opposite side of the device body could also be used to compensate and balance the device 10. It could be made shallower than balancing bore 39 but extend substantially greater distance around the sidewall of device 10. Other possibilities for mass removal exist. Again, the precise size and location can be achieved by empirical methods in trial and error. There are also some known in the art balancing methods that can be used.

FIGS. 4A-F show, in substantial detail, the shape of clamping surface 48. It has a curvature which is substantially similar to the radius of curvature of blind bore 28 for the bit shank. However, that surface could be configured differently. For example it could simply have a straight taper. It has been found, however, that a straight taper may not work as well as the configuration shown in the drawings for surface 48.

D. Operation

The operation of bit extension 10 has been basically described previously clamping sleeve 40 would be slideably inserted into sleeve section 32 of clamping bore 30, with O-ring 60 between it and shoulder 33. Bolt 50 with wear-washer 62 would be inserted from the opposite end of clamping bore 30. The threaded shaft of bolt 50 would mate into the internal threaded bore 42 of clamping sleeve 40. Clamping sleeve 40 would be brought near opening 38 from clamping bore 30 to blind bore 28.

A tool bit shank could be inserted in blind bore 28. Bolt 50 could be turned to hold clamping sleeve 40 into clamping configuration to the side of tool bit in blind bore 28. Bit extension 10 could then have its shank inserted into the hold mechanism for the rational power source. Alternatively, bit extension 10 could be first mounted in the rotational power source and then the tool bit inserted in blind bore 28 and clamped in place with a one-tool rotation of bolt 50.

Reverse action on bolt 50 would reverse the clamping action of clamping sleeve 40. The bit could be pulled out of blind bore 28. Bit extension 10 could be left in place on the rotational power source or removed according to conventional methods.

Following is a description of functions and advantages of the exemplary embodiment.

One embodiment of the invention consists of an extension with a body:

a round tool shank 22 sized and shaped at its first end design to be inserted into the factory chuck/chuck of a woodworking router and be retained by the collets;

a blind unthreaded bore 28 at the opposite end into which the shank of the router bit can be inserted; a tangential clamping surface or mechanism 48 perpendicular to said bore;

said clamping mechanism comprising:

a sleeve/wedge 40 with a through-bore 44;

the through-bore 44 of the sleeve/wedge 40 being internally threaded;

a threaded fastener 50;

a through-bore 32 perpendicular or tangential to the blind bore 28;

said threaded fastener 50 being located at one first end of the tangential bore 32;

said wedge or clamping surface 48 being located at second end of the tangential bore 32;

said sleeve/wedge 40 and threaded fastener 50 being at generally opposing ends of bore;

said bore 32 being situated so as to work with the forces of rotation of the bit when in use to allow the clamping sleeve/wedge 40 mechanism to self-tighten to some degree;

said bore 32 having first, second, and third sections, each being of three dimensions in cross-section;

two of the dimensions being concentric with each other and being off-set forwards the periphery of the body 20 from the remaining portion of the bore;

the first section of said bore 32 being sized to receive a clamping sleeve/wedge;

the first section 32 being located so as to allow the sleeve/wedge 40 edge to penetrate the blind bore 28 for the shank;

the second section 34 being of a reduced size to accommodate the threaded clamping method;

the second section 34 of the bore being off set from centerline of the first section 32 towards the outer periphery of the body 20;

the third section 36 being sized to accommodate the head of the threaded clamping means 50;

the third section 36 of the bore being off-set towards the periphery of the body 20 from the first section 32 of the bore and concentric with the second section 34;

a threaded means 50/method to draw in and retain the sleeve/wedge 40;

a sleeve/wedge 40 sized in diameter to be slip-fit in first section 32 of the bore;

the sleeve/wedge 40 being sized as to nearly fill the bore along its centerline in which it slides;

this helps in the balancing operation as less material is in reality removed;

the shape of the sleeve/wedge 40 is essentially round on cross-section;

the sleeve/wedge 40 having a bore 42 parallel to the centerline;

said bore 42 being eccentric to the periphery of the sleeve/wedge 40;

said bore 42 being threaded;

a sleeve/wedge 40 of unequal wall thickness and being approximately half the depth of the bore 32 in length, in which the sleeve is inserted and retained;

the sleeve/wedge 40 having a radius perpendicular to the center line machined to match the outer radius of the extension body 20 at a first end;

the sleeve/wedge 40 having a radius perpendicular to the centerline machined onto it at the second end which matches the radius of the blind bore 28 at the second end and said radius is parallel to the blind bore of the body 20;

said radius being greater than 45° tangent to the blind bore 28;

said radius not being greater than 64° tangent to the blind bore 28;

the sleeve/wedge 40 being bored off-center;

the sleeve/wedge 40 being threaded off-center;

the periphery of the sleeve/wedge 40 thus being eccentric to the centerline of the sleeve 40;

the off-center bore 42 and threading serving as an anti-rotation means;

said off-set machining serving as an alignment means for the sleeve/wedge 40 in regards to the blind bore 28;

said off-set machining keeping the radius on the second end in parallel alignment with cutter shank inserted into blind bore 28;

said off-set boring 42 serving to align the radius machined into the first end with the periphery of the body 20;

a washer/ring 62 positioned under the head of the threaded clamping method 50 to reduce wear and friction;

a resilient ring or rings 60 to bias the sleeve 40 to an unclamped position;

said ring 60 also serves to align a reducing sleeve (not shown) when used;

said ring 60 location also serves as an indexing means when needed;

the threaded clamping method 50 includes a hex-shaped recess 54 in its first end, the threaded clamping method 50 which includes as its second end a threaded portion;

the threaded portion which is of a reduced size in comparison to the first end;

the threaded clamping method 50 which includes at its second end a threaded portion;

the threaded portion which is of a reduced size in comparison to the first end;

the threaded portion which starts below the head of the fastener and extends along the centerline of the fastener 50 to the opposite end;

an anti-rotation method;

the anti-rotation means/method which consists of off-set boring threading 42 of the sleeve 40;

said second section of the bore 34 for the threaded fastener being concentric with the threaded bore 42 of the sleeve/wedge 40;

said first section 32 of the bore for the sleeve/wedge 40 in the body 20 being eccentric to bore 36 for the threaded fastener 50; said eccentric relationship thereby preventing the sleeve/wedge 40 from rotating in its bore 32;

said anti-rotation feature thereby keeping the parallel alignment between the radius on the second end of the sleeve/wedge 40 and the blind bore 28 into which the bit is inserted;

the radius at the first end matching body diameter also allows tactile indication of alignment;

this serves to ease assembly due to automatic alignment of the wedge 40 with the blind bore 28;

balancing is accomplished via a counter-balance hole 39 drilled in the same plane as the sleeve/wedge 40 and the threaded clamping means peripheral bore 32;

this method of balancing eliminates the harmonic vibration present in other design based on the wedge design;

the balance is also enhanced by the shape of the sleeve/wedge 40 being nearly identical to the bore 32 in which it slides resulting in less missing mass on the plane of the body 20.

As can be seen, there are various aspects of the exemplary embodiment that can be used together or optionally.

OPTIONS AND ALTERNATIVES

It will be appreciated that the present invention can take many forms and embodiments. Variations obvious to those skilled in the art will be included within the invention. The foregoing exemplary embodiment is but what one form the invention can take.

Materials, dimensions and configurations can vary. Balancing bore 39 is optional, as is wear-washer 62. The exemplary embodiment eliminates the need for hardened steel for body 20. It has been found that thread-wear of bolt 50 and wear of wedge 48 is better than most conventional devices.

The basic concept is to utilize a clamping sleeve having a relatively large outer bearing surface that is pulled towards blind bore 28. A relative large clamping surface is exerted in a consistent, even form on the side of the bit shank in bit extension 10. Sleeve 40 can be of different shapes and configurations. For example, it could be of different cross section (e.g. other than round). It could be made of multiple pieces. The O-ring is also optional.

One optional method of making bit extension 10 is now described. As can be appreciated, clamping sleeve 40 would exert clamping force tangentially on one side of the bit shank in blind bore 28. Because of manufacturing tolerances and variations of the bits, the centerline of the bit can end up slightly off-set from the centerline of blind bore 28. This off-set can be measured or approximated.

When forming body 20 of bit extension 10, this off-set can be compensated in the follow way. Body 20 can be initially turned on a metal lathe, leaving some excess around its periphery. Blind bore 28 can be formed along the centerline of that initial, oversized form. The centerline of blind bore 28 and the centerline of the initial formation of shank 22 could be coaxial.

Final machining of the exterior body 20 could take place as follows. The centerline of the final shank 22 could be off-set from the centerline of blind bore 28 in the direction that it is estimated the bit would move off the centerline of blind bore 28 when clamped. This would align the centerlines of the bit when clamped in the centerline of the bit extension shank 22. Thus, that coaxial alignment would reduce whipping of the tool during rotation. Additionally, some mass can be machined off of the side opposite the direction of off-set from blind bore 28 from the upper body portion 26. Essentially, as illustrated by dashed-line 11 in FIG. 1A, a moon-shaped shaving from the side opposite the direction of off-set of the bit could be machined off of body portion 26 to balance the mass of body portion 26 in light of the off-set of the bit and off-set of the shank 22 from the centerline of the blind bore 28. The figures highly exaggerate such a shaving or mass removal and is for illustrative purposes only. It may be only just a fraction of a millimeter or so.

Other options and features are possible.

Note that some of the drawings show planes 1, 2, and 3. These illustrations show how the sleeve 40 and bolt 50 are opposed to one another on basically opposite sides of body 20 (planes 1 and 2). Stated differently, the clamping bore basically extends through opposite parallel planes 1 and 2 and tangential to blind bore 28. Further, plane 3 illustrates the basic orthogonal plane at the opening to balancing bore 39. It shows how the balancing bore does not have to be directly perpendicular to either plane 1 or 2. It could be off-set somewhat be still generally opposite the clamping bore. Note also how the curved end 44 of clamping sleeve 40 is configured to follow the curvature of the outside sidewall of body 20.

Although the preferred embodiment is entitled a bit extension and has a shank 22 that can be fit into some other clamping mechanism that would in turn be operably connected to a source of rotary power, it also is possible that clamping configuration shown and described could be integrated into a rotational member. In other words, it could become or be a chuck, arbor, or part of a router armature, or an analogous configuration.

What is claimed is:

1. A bit extension for releasably clamping a bit or tool in an extended fashion from a rotational power source comprising:
   a. a body comprising a shank adapted for removable connection to a rotational power source and an opposite end having a blind bore with a radius of curvature extending inwardly of the opposite end;
   b. a generally tangential clamping bore intersecting with the blind bore through a sidewall of the opposite end of the body, the clamping bore including a clamping sleeve section from one side of the body inwardly to an inner section of reduced diameter and a third section opposite the clamping sleeve section from the inner section terminating with an opening on another side of the body;
   c. a clamping sleeve slideably insertable into the clamping sleeve section of the clamping bore; the clamping sleeve including an internal threaded through-bore and an eccentric periphery relative to a centerline of the through-bore including a clamping surface that is adapted to follow the general radius of curvature of the blind bore but enter the blind bore at the intersection of the blind bore and the clamping bore;
   d. a threaded fastener insertable through the third section of the clamping bore into mating threadable engagement with the threaded through-bore of the clamping sleeve, the threaded fastener being rotatable by a single tool through a tool interface;
   e. so that the clamping sleeve can be drawn towards the intersection of the clamping bore with the blind bore to provide clamping action to a bit in the blind bore.

2. The bit extension of claim 1 further comprising a biasing means in the clamping bore which biases the clamping sleeve out of the body.

3. The bit extension of claim 1 further comprising a balancing for generally opposite the clamping bore on the body.

4. The bit extension of claim 1 wherein the clamping sleeve and sleeve section of the clamping bore extends approximately halfway or more through the body.

5. A clamping mechanism for releasably clamping a bit or tool in an extended fashion from a rotational power source comprising:
   a. a body having a shank adapted for removable connection to a rotational power source and an opposite end having a blind bore with a radius of curvature extending inwardly of the opposite end;
   b. a generally tangential clamping bore to the blind bore through a sidewall of an upper portion of the body, the clamping bore including a clamping sleeve section from one side of the body inwardly to an inner section of reduced diameter and a third section opposite the clamping sleeve section from the inner section terminating with an opening on another side of the body;
   c. a clamping sleeve slideably insertable into the clamping sleeve section of the clamping bore; the clamping sleeve including an internal threaded through-bore and an eccentric periphery relative to a centerline of the through-bore including a clamping surface that is adapted to follow the general radius curvature of the blind bore but enter the blind bore at the intersection of the blind bore and the clamping bore;
   d. a threaded fastener insertable through the third section of the clamping bore into mating threadable engagement with the threaded through-bore of the clamping sleeve, the threaded fastener being rotatable by a single tool through a tool interface;
   e. so that the clamping sleeve can be drawn towards an inner section of the clamping bore with the blind bore and having a clamping surface that is adapted to follow the general radius curvature of the blind bore but enter the blind bore to provide clamping action to a bit in the blind bore.

6. The clamping mechanism of claim 5 wherein the clamping mechanism comprises a chuck.

7. The clamping mechanism of claim 5 wherein the clamping mechanism comprises a router armature.

8. The clamping mechanism of claim 5 further comprising a portion roughly opposite the clamping bore on the body with mass removed to compensate for voids of space on an opposite side of the body created by the clamping bore and the threaded fastener for balancing the clamping mechanism.

9. The clamping mechanism of claim 8 wherein the portion with removed mass comprises a blind bore.

10. A clamping mechanism for releasably clamping a bit or tool in operative connection to a rotational power source comprising:
    a. a body having a bit or tool shank receiving bore;
    b. a generally tangential clamping bore to the bit or tool receiving bore, the clamping bore having opposite ends;
    C. a clamping sleeve slidably inserted into one opposite end of the clamping bore, the clamping sleeve including an internal threaded through-bore and a clamping surface that enters an opening in the tool or bit receiving bore;
    d. a threaded fastener insertable through the other opposite end of the clamping bore, and having a threaded end engageable with the internal threaded through-bore of the clamping sleeve and a head end;
    e. a shoulder in the clamping bore towards which the clamping sleeve and head end of the threaded fastener can be moved from opposite directions by rotation of the threaded fastener;
    f. so that the clamping sleeve can be drawn towards the opening in the tool or receiving bit bore to bring the clamping surface into engagement with a tool or bit shank in the tool or bit receiving bore.

11. The mechanism of claim 10 wherein the clamping mechanism is a bit extension including a shank adapted for removal in connection to a rotatable power source.

12. The mechanism of claim 10 wherein the internal threaded through-bore of the clamping sleeve is offset from the center line of the clamping sleeve.

13. The mechanism of claim 10 wherein the clamping surface has a radius of curvature that is at least similar to the radius of curvature of the bit or tool receiving bore.

14. The mechanism of claim 10 further comprising a portion on the body with mass removed to compensate for imbalance caused by clamping sleeve and threaded fastener.

15. The mechanism of claim 14 wherein the portion with the removed mass comprises a blind bore.

16. The mechanism of claim 15 wherein the blind bore is not exactly opposite the clamping sleeve across the bit or tool receiving bore, but is offset in a lane of the clamping sleeve.

17. The mechanism of claim 10 wherein the clamping sleeve has a clamping portion radius to match or substantially match the outside diameter of the body.

18. The mechanism of claim 10 wherein the clamping surface has high wrap-around tangency to deter marring and denting of the shank of any bit clamped.

19. The mechanism of claim 10 wherein the bit or tool shank receiving bore and body are manufactured to ensure the center line of any bit is concentric to the center line of the arbor or clamping mechanism shank when in the form of a bit extension which is adapted to be clamped into a machine arbor or collets.

20. The mechanism of claim 10 wherein mass and length of the mechanism are designed to reduce or alleviate a whipping problem.

21. The mechanism of claim 10 wherein the generally tangential clamping bore is elongated to promote a larger bearing surface for the clamping sleeve.

22. The mechanism of claim 10 wherein the clamping sleeve is oriented to work with rotation of a bit or tool to effect a self-clamping or enhancement of clamping force provided by the threaded fastener.

23. The mechanism of claim 10 further comprising a resilient member position in the clamping bore to bias the clamping sleeve outwardly of the bore.

24. The mechanism of claim 10 wherein the body is machined to locate a center line so that the center line of any arbor/collets eliminate or reduce off center rotation of a bit regardless of mass inserted in the bit or tool receiving bore.

* * * * *

UNITED STATES PATENT AND TRADEMARK OFFICE
CERTIFICATE OF CORRECTION

PATENT NO. : 7,506,877 B1
APPLICATION NO. : 11/331760
DATED : March 24, 2009
INVENTOR(S) : David L. Henderson et al.

Page 1 of 1

It is certified that error appears in the above-identified patent and that said Letters Patent is hereby corrected as shown below:

Col. 15, Claim 16, Line 18:
Delete "lane"
Add --plane--

Signed and Sealed this

Ninth Day of June, 2009

JOHN DOLL
*Acting Director of the United States Patent and Trademark Office*